Dec. 3, 1957 F. L. DODGE 2,814,959
VARIABLE SPEED DRIVE
Filed Feb. 20, 1956 7 Sheets-Sheet 1

Inventor:
Floyd L. Dodge,
by W. H. Hamilton
Attorney

Inventor:
Floyd L. Dodge,
by
Attorney

Dec. 3, 1957  F. L. DODGE  2,814,959
VARIABLE SPEED DRIVE

Filed Feb. 20, 1956  7 Sheets-Sheet 6

Inventor:
Floyd L. Dodge,
by [signature]
Attorney

United States Patent Office 2,814,959
Patented Dec. 3, 1957

2,814,959

VARIABLE SPEED DRIVE

Floyd L. Dodge, Waltham, Mass., assignor to The Wade Tool Co., Waltham, Mass., a corporation of Massachusetts Application February 20, 1956, Serial No. 566,486

4 Claims. (Cl. 74—745)

This invention relates, in general to drive mechanisms and, in particular, to a variable speed drive for controlling the spindle speed of a lathe over a considerable range of such speeds.

It is well known in the art that providing a suitable driving gear mechanism which will furnish the necessary flexibility for lathe operation is necessarily attended by a considerable amount of gear noise since several different sets of driving gears are necessarily maintained in driving relationship and, at high speeds, tend to produce the troublesome noise referred to.

It is a principal object of the present invention to deal with this particular problem of excessively noisy gear operation and to provide an improved variable speed drive for a lathe spindle which will eliminate to a considerable extent the cause for gear noise and interference. More specifically, it is an object of the invention to devise an organization of coaxially disposed driving members and clutch mechanisms by means or which there may be achieved much greater smoothness, efficiency and quietness of operation than has heretofore been accomplished, especially in connection with reverse gear driving mechanisms. It is a further object of the invention to devise a speed control which is of a relatively simplified construction which is characterized by a long life and which affords a maximum of convenience and flexibility in its operation.

These and other objects and novel features will be more fully understood and appreciated from the following description of a preferred embodiment of the invention selected for purposes of illustration and shown in the accompanying drawings, in which—

Figure 1:
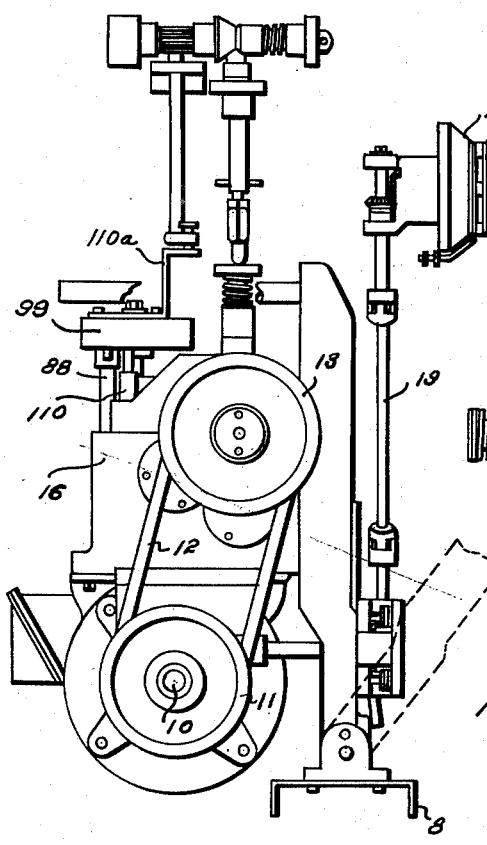
Fig. 1 is an elevational view illustrating somewhat diagrammatically the variable speed driving mechanism of the invention as viewed from one end thereof.

The variable speed drive of the invention is based upon the novel concept of mounting a variable speed driver member and an independently supported low speed shaft in a position such that they may rotate about a common axis of rotation. With this specific combination, there is provided special clutch mechanisms for selectively driving the low speed shaft at a rate of speed corresponding to the speed of the high-speed driver, or at desired low speeds, or in a reversely directed manner. I have found that I may, by this basic arrangement of parts, which involves rotation of two independently supported members along a common axis, very materially reduce gear noise and provide for a highly desirable variable speed drive operation, especially characterized by quietness and smooth running qualities.

In conjunction with this novel combination of parts, I have further devised a multiple clutch and operating rod assembly by means of which I may provide three different clutch movements independently of one another and yet employ only a single control lever.

Referring more in detail to the drawings, numeral 2 denotes a lathe of conventional character having a headstock 4 in which is received the usual driving spindle. The lathe is mounted on a cabinet 6, as shown in Fig. 8, and at the lower left-hand side of this cabinet is a compartment in which I preferably mount the variable speed drive of the invention.

The variable speed drive includes a frame F which may be disposed on a base 8 and attached to the cabinet in any desirable manner. At some convenient point in the frame or cabinet, I provide an electrical motor M (Fig. 2) which drives a shaft 10 on which is mounted a variable pitch pulley 11. A belt 12 extends around pulley 11 and a second variable pitch pulley 13 in turn mounted on a high-speed driver member 14.

Figure 2:
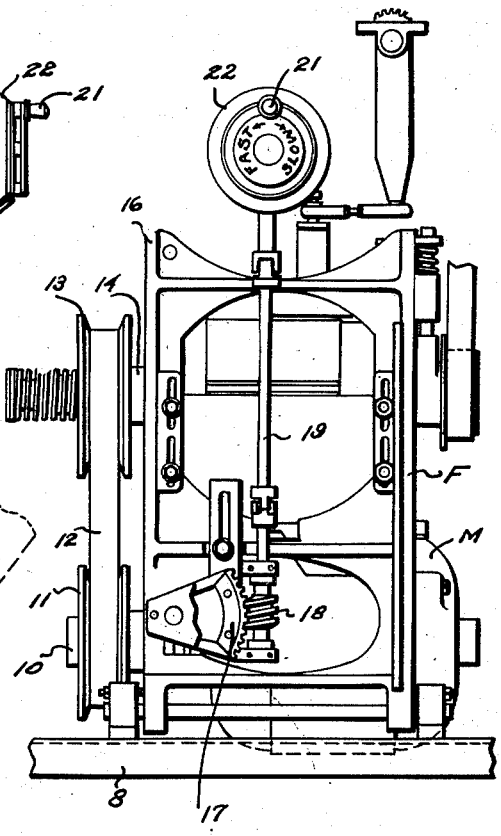
Fig. 2 is another elevational view somewhat similar to Fig. 1 but showing the mechanism when viewed from its front side.
Figure 4:
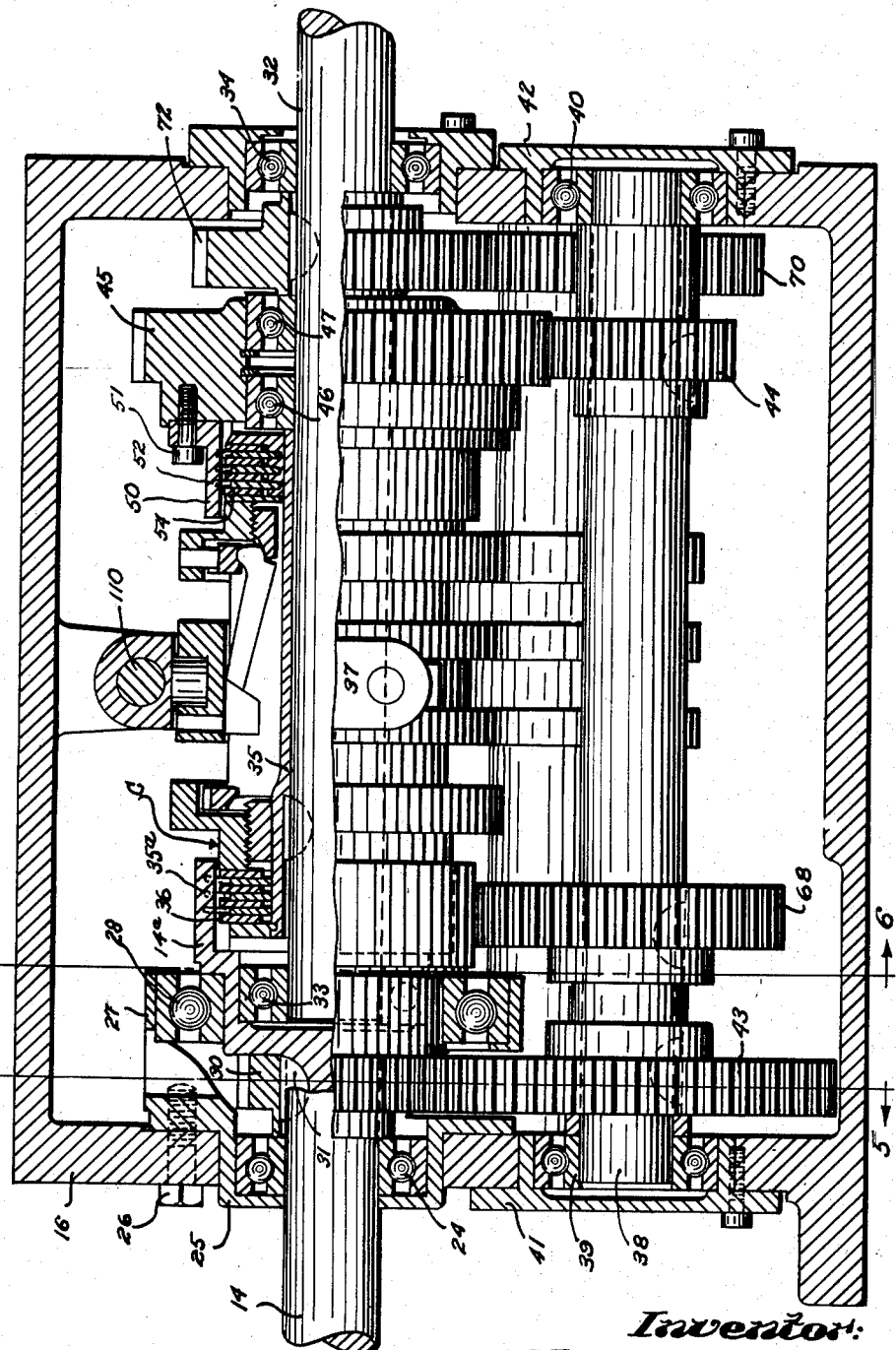
Fig. 4 is a vertical cross-section taken approximately on the line 4—4 of Fig. 6.
Figure 8:
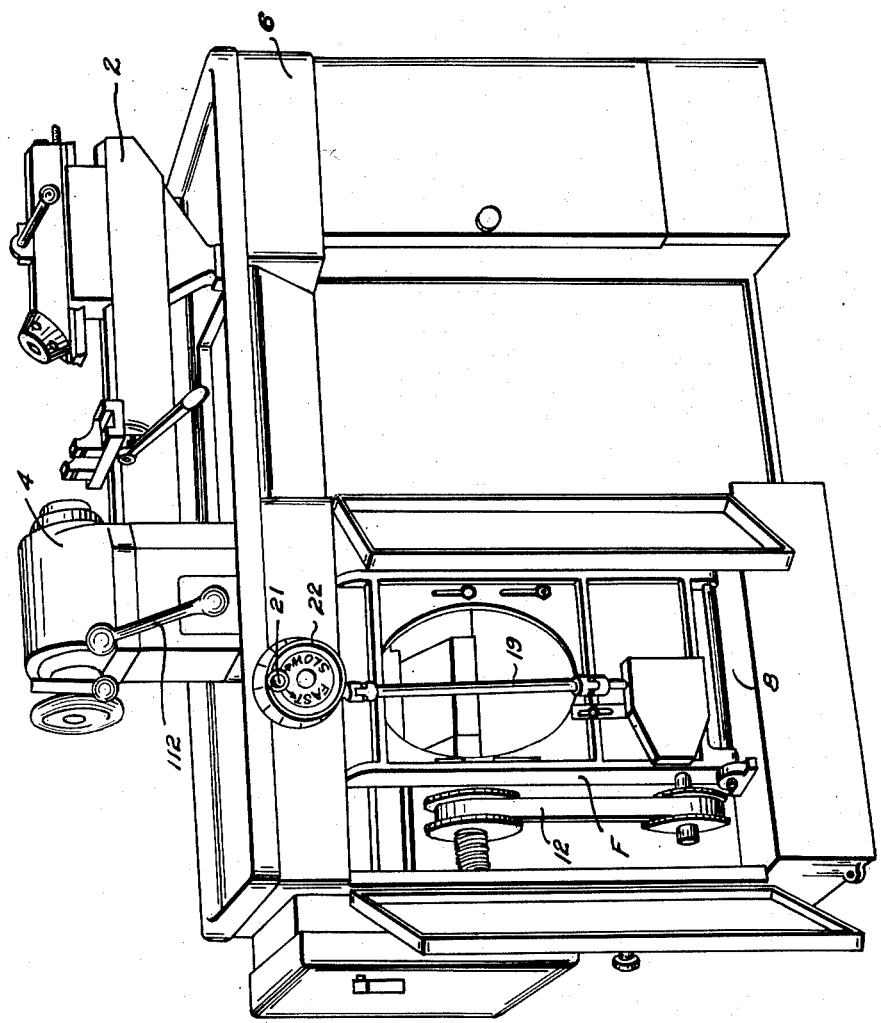
Fig. 8 is a perspective view of a lathe showing the supporting cabinet on which the lathe is mounted and further indicating at the lower left-hand side of the cabinet portion the variable speed drive mechanism of the invention located in an operative position with respect to the lathe spindle.
Figure 9:
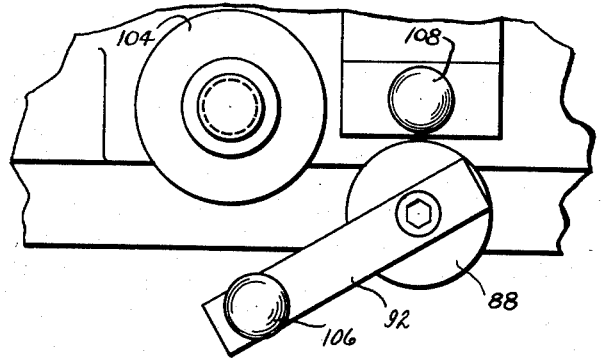
Fig. 9 is a detail plan view of portions of the clutch actuating rod mechanism.
Figure 10:
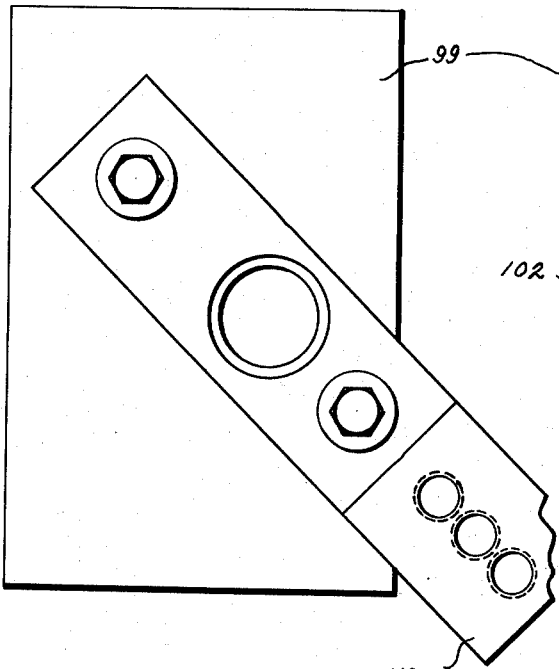
Fig. 10 is a detail plan view of a cam element and operating rod employed in controlling the clutch rod elements shown in Fig. 9.
Figure 11:
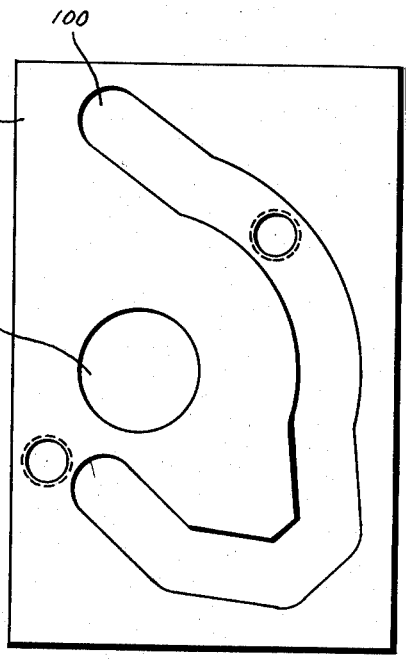
Fig. 11 is a bottom plan view of the cam element.

The driver member 14 is rotatably received through one side of a gear box 16, as best shown in Fig. 4, and the latter gear box occurs at the upper portion of the frame F, as suggested in Figs. 2 and 8. The operation of these variable pitch pulleys 11 and 13 is of conventional character, the pitch diameter of the pulleys being varied by means of a segment gear 17 and worm 18 operated through a rod 19 and coupling 20 in turn linked to a handle 21 in a dial casing 22, as best shown in Figs. 1, 2 and 8. Rotating the handle 21 operates to turn the high-speed driving member 14 at greater or lesser speeds, as desired.

Figure 5:
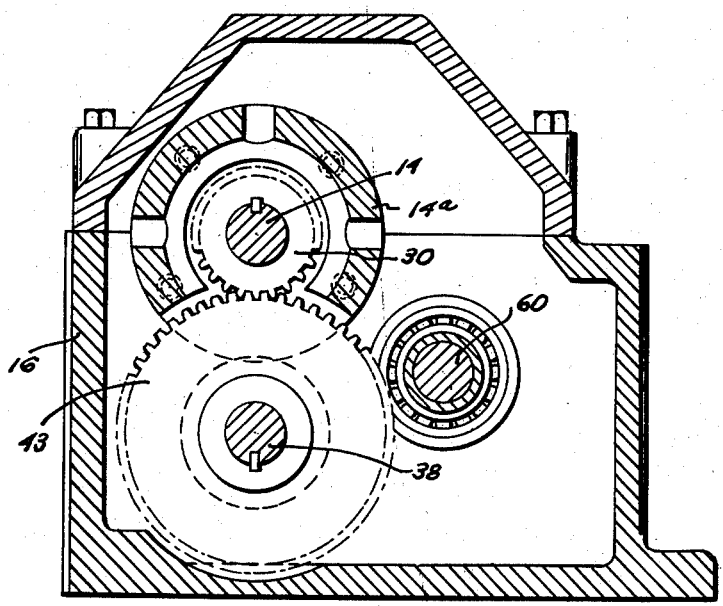
Fig. 5 is a cross-section taken on the line 5—5 of Fig. 4.
Figure 6:
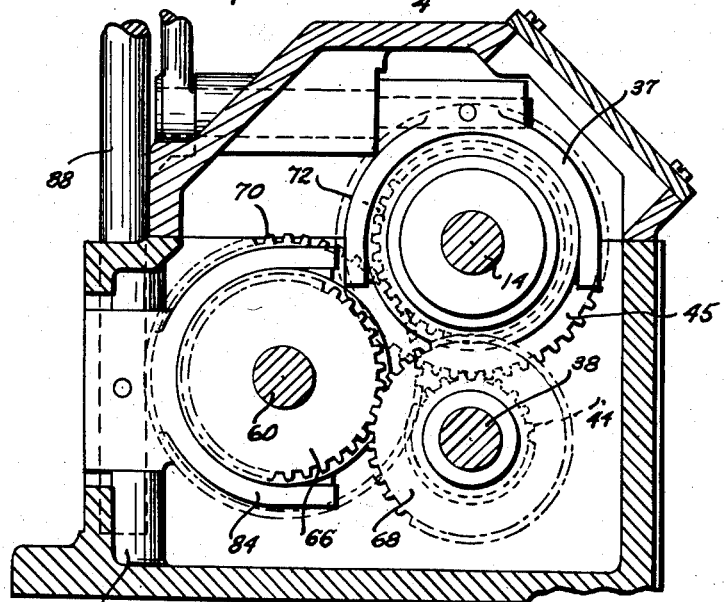
Fig. 6 is a cross-section taken on the line 6—6 of Fig. 4.

In accordance with the invention, I mount the high-speed driver 14 through the gear box 16 in the manner generally illustrated in Figs. 4, 5 and 6. The driver 14 is best shown in Fig. 4 and is specially constructed with a shaft portion and high-speed driving ring section of enlarged diameter indicated by the numeral 14a. The shaft portion of this high-speed driver is rotatably supported in a bearing 24 in turn received in a bearing holder 25 which is solidly bolted by means of bolts as 26 against the inner surface of the gear box 16, as illustrated in Fig. 4. This bearing holder is formed with an annular extension 27, and within the annular extension 27 is provided a second larger bearing 28 constructed and arranged such that it may rotatably support the outer surface of the driving ring portion 14a. Also mounted on this shaft 14 between the driving ring portion 14a and the bearing 24 is a gear 30 secured by a key 31 on the gear portion.

Arranged within the gear box is a low-speed driving shaft 32 which is, in accordance with the invention, disposed such that it may rotate about the same axis of rotation as the high-speed driving member 14. For this purpose, I provide for one end of this low-speed driving shaft being rotatably supported in a bearing member 33 fitted within the driving ring portion 14a in the manner suggested in Fig. 4 and in such a position that the end of the shaft 32 is slightly spaced away from this driving ring portion 14a.

Figure 3:
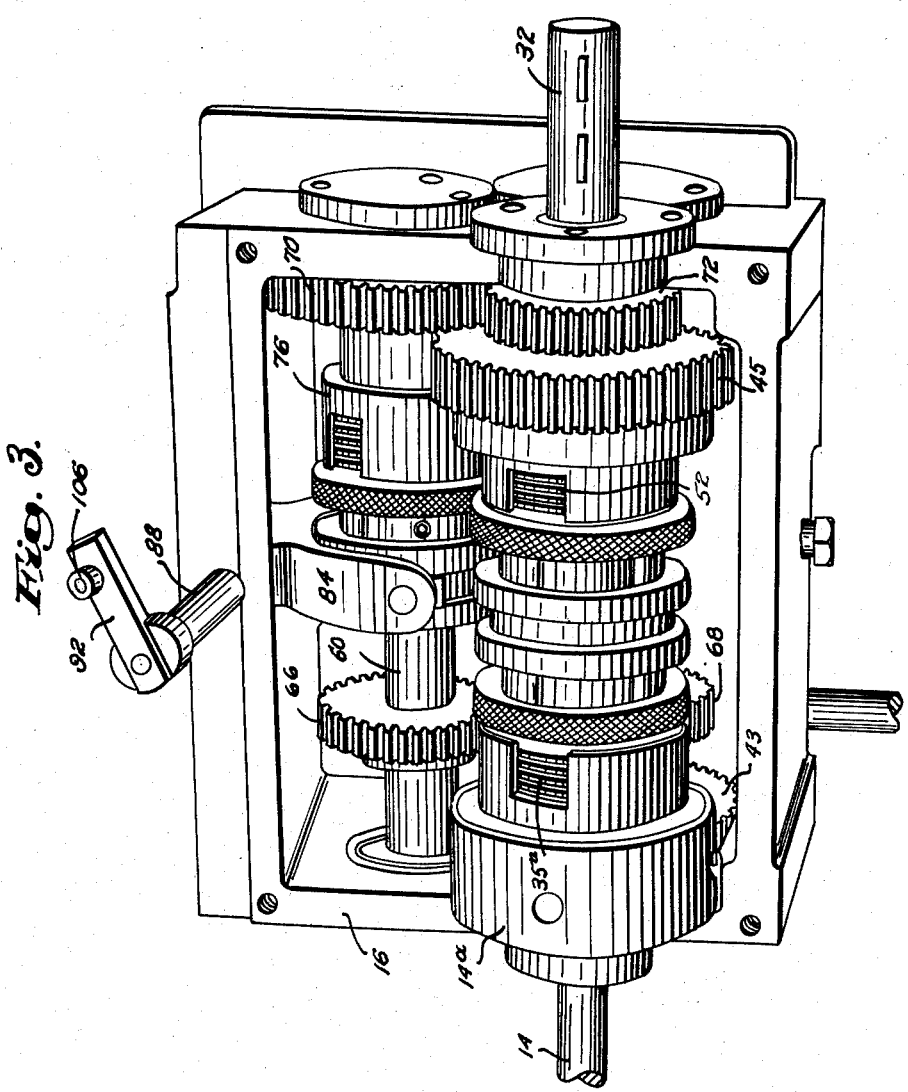
Fig. 3 is a perspective view of the driving gear mechanism and supporting gear box viewed from a point above the mechanism with the gear box cover having been removed.

At its other end, the shaft 32 is supported in a bearing 34 and projects outwardly in a position such that it can carry a spindle driving pulley not shown in the drawing. At intermediate portions of the shaft 32, I locate a clutch sleeve 35 solidly keyed to the shaft, as shown in Fig. 4. The sleeve member 35 has mounted on its left-hand end thereof, as viewed in Fig. 4, a high-speed clutch control mechanism generally denoted by the arrow C. This mechanism includes circular clutch plates 35a which have outer peripheral extensions adapted to engage in slotted sections of the high-speed driving ring 14a. These plates 35a are also shown in Fig. 3 and are free to turn on the sleeve 35 when the driving ring 14a is rotating. These clutch plates 35a are also loosely supported between a second set of clutch discs 36 mounted on the end of the sleeve 35 and normally rotating with this member when the shaft 32 is actuated.

In accordance with the invention, the shift yoke 37 of the clutch is pivoted in a clockwise direction, as viewed in Fig. 4. This forces the clutch plates together and locks the high-speed driving ring 14a, together with the sleeve 35 and the shaft 32. By means of this arrangement, therefore, it will be seen that any desired speed which may be developed in the high-speed driving member 14 from the variable pitch pulleys can be directly transmitted from the driving ring to the shaft 32 and employed to drive the lathe spindle at relatively high speeds. It will be observed that, by means of the arrangement described, I am enabled to not only provide for a direct coupling between the high-speed driver and the low-speed shaft but I am also able to mount on the shaft portion the gear 30 in a position such that it occurs between two sets of bearings 24 and 28 and can be most efficiently held for quiet operation when the shaft is turning at high speed.

In order to drive the shaft 32 about the same axis of rotation as that of the high-speed driving member 14 and, yet, at a much lower rate of speed, I have further devised a special low-speed clutch and reduction gear mechanism which is designed to take advantage of the particular arrangement of the gear 30 and is shown in Figs. 4, 5 and 6. This mechanism includes a shaft member 38 which, as will be observed from an inspection of Figs. 5 and 6, occurs in vertical alignment with the shaft 14 and gear 30 near the bottom of the gear box 16. This shaft is rotatably received in the sides of the gear box in bearings 39 and 40 enclosed in respective bearing mounts 41 and 42.

Keyed to the shaft 38 is a large gear 43 which is arranged to continuously mesh with the gear 30. Also fixed on the shaft 38 is a second gear 44 adapted to mesh with another gear 45 which is supported on a pair of idler bearings 46 and 47 in turn supported around the shaft 32 at the end of the sleeve member 35.

On the gear 45, I mount a low-speed driving ring, part 50, which may be secured, for example, by bolts 51 threaded through a flange portion of the driving ring, as shown in Fig. 4. This driving ring, part 50, is recessed to receive peripheral extensions of clutch plates as 52 corresponding to clutch plates 35a already described. The plates 52 are free to turn with the driving ring 50 about the shaft 32 and are loosely engaged by clutch plates 54. When the shift yoke 37 is pivoted in a counterclockwise direction, as shown in Fig. 4, the clutch plates are forced together and the driving ring 50 is locked to the sleeve 35 and shaft 32.

It will be apparent that, with the shifter yoke 37 in the engaged position described, the high speed clutch is necessarily disengaged and the rotative movement of shaft 14 is carried through the reduction gears 43 and 44 to turn the shaft 32 at a suitable low rate of speed. It will also be observed that the reduction gears 43, 44 and 45 are so organized and arranged by means of the coaxial relationship of shafts 14 and 32 and by the vertically parallel relationship of the shaft 38 with respect to both of these shafts that it is possible to take up and absorb substantially all of the driving forces of gears 30, 43, 44 and 45 on the pair of idler bearings 46 and 47 which are also turning about the common axis. This is, in a large measure, responsible for the radically reduced meshing noise of the several sets of gears which must be employed in variable speed drive mechanisms.

Figure 7:
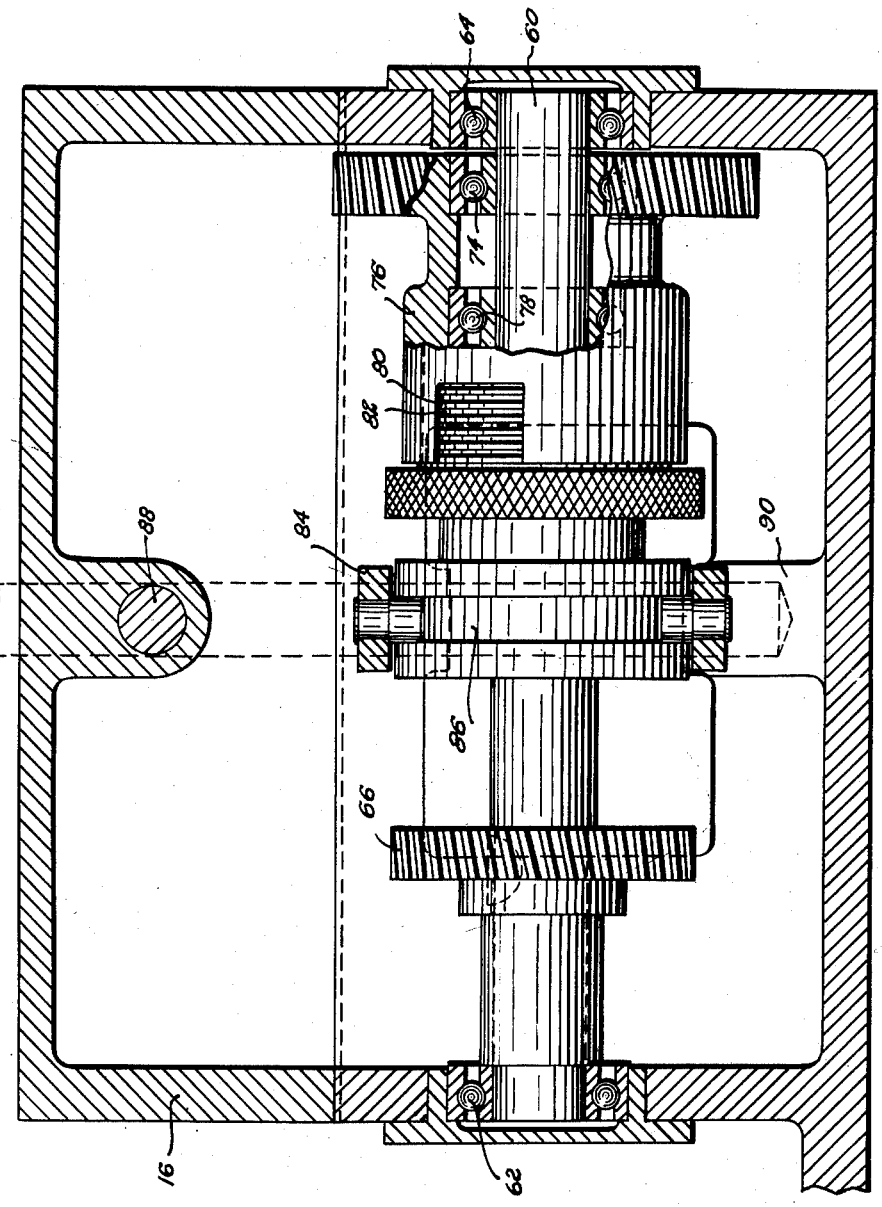
Fig. 7 is a cross-section taken on the line 7—7 of Fig. 6.

The quietness and smoothness of operation which is found to be inherent in the coaxial shaft arrangement now described for forward speeds may also, I have determined, be accomplished by a reverse gear and shaft assembly which I have designed to provide a reverse turning movement for the low-speed shaft 32 when so desired. For this purpose, I find I may mount in the gear box 16 a third shaft 60 which is more clearly shown in Figs. 6 and 7. As noted in Fig. 7, the two ends of this shaft are rotatably mounted in bearings 62 and 64 and, on this shaft, I mount a fixed gear 66 which is adapted to mesh with a gear 68 on shaft 38, as is best shown in Fig. 6.

At the opposite end of shaft 60, I provide another gear 70 arranged to mesh with a gear 72 and shaft 32. The gear 70 is received on idler bearing 74 on the shaft 60 and includes a driving ring portion 76 which is rotatable on a second idler bearing 78. On the shaft 60, I provide a reverse clutch mechanism which includes clutch plates 80 engaging in slots in the driving ring portion 76. These plates 80 are normally free to turn but may be locked to shaft 60 by plates 82 when the latter members are forced together in the manner already described.

To operate this clutch mechanism, I provide a separate shifter yoke 84 which has engaging pads received in the channeled part of the clutch slide 86. The yoke 84 is pivoted about a vertical axis formed by a clutch post 88 supported in a bearing portion 90 and having an arm 92 to engage the reverse clutch mechanism described.

It will be noted that the vertical axis of turning of the reverse clutch lies in a plane which passes through the horizontal axis of turning of the clutch yoke 37 with the result that a desirable single control may be devised to simultaneously operate either one of the clutch yokes. When the reverse clutch mechanism is engaged, the drive is from shaft 14 through gears 30 and 43 then through gear 68 to gear 66. This gear turns shaft 60 and with it driving ring 76 and gear 70 which reverses the direction of rotation by engaging gear 72 and shaft 32.

In this case also, it will be observed that the same two shaft means, namely, the driver shaft 14 and the low-speed shaft 32 continue to supply the rotative movement to the lathe spindle while operating along a common axis of rotation with the results that even when a reverse rotation is desired the same smoothness and quietness of operation is achieved.

As noted above I have devised a single control rod apparatus for actuating each of the clutch mechanisms, and this apparatus is illustrated in detail in Figs. 1 and 9–11, inclusive. A principal component of this apparatus is a cam block 99 best shown in Figs. 10 and 11, which is formed at its underside with a cam track 100 and a bore 102. On the rear side of the gear box 16 adjacent to the clutch post 88, I provide a cam support stud 104 which is adapted to pass through bore 102 of cam block 99. At one end, the cam track 100 engages over and guides a stud 106 on the end of arm 92 of reverse clutch post 88. At its other end, the cam track engages over and guides another lug portion 108 (Fig. 9) which is attached to clutch pivot 110 of shifter yoke 37. Fixed to the top of the cam block 99 is a lever 110a. This lever is connected through the lathe housing to a control handle 112, best shown in Fig. 8.

Turning this handle 112 about a horizontal axis causes the cam block through its cam track 100 to move the part 108 into either a high-speed or low-speed forward position. Turning the handle 112 into an extended range in one direction of rotation moves the stud 106 into a reverse speed position.

From the foregoing description, it will be apparent that I have provided a new combination of variable speed drive parts organized in a coaxially disposed position which prevents much of the gear noise heretofore present in variable speed drive mechanisms, particularly those in which the part which rotates the lathe spindle is rotated about a different axis of rotation from that of the power-driven part.

While I have described a preferred form of the invention, I may modify and change the structure illustrated in various ways in keeping with the scope of the appended claims.

Having thus described my invention, what I claim is:

1. A variable speed drive mechanism comprising in combination a high speed driver, power driven means for revolving the high speed driver at a desired rate, a low speed shaft supported for rotation about an axis which is common to the axis of rotation of the high speed driver, means for operatively connecting the high speed driver in driving relationship with the low speed shaft, a high speed clutch mechanism adjustably supported on said low speed shaft in a position to engage with the high speed driver and couple the low speed shaft thereto, a second low speed clutch mechanism adjustably supported on the low speed shaft, reduction gear means under the control of said low speed clutch for operatively connecting the high speed driver to the low speed shaft when the said first clutch is disengaged, and a third reverse clutch mechanism, said reverse clutch mechanism comprising a shaft, independently supported reverse gears on said shaft, a clutch element adjustable along the reverse gear shaft for operatively connecting the reverse gears in driving relationship between the high speed driver and the low speed shaft.

2. A structure according to claim 1 including a control lever apparatus for selectively operating each of said clutches, said control lever apparatus having a common cam element constructed and arranged to move the clutch mechanism in a predetermined manner in response to adjustment of the control lever.

3. A structure according to claim 1, including a plurality of clutch actuating rods, a cam having a cam slot supported for pivotal movement around said clutch rods and a control lever for selectively operating each of said clutch rods through the said common cam.

4. A variable speed drive mechanism for a lathe comprising in combination a frame, a gear box supported in the frame, a high-speed driver member rotably mounted through one side of the gear box, an electrical motor, variable pitch pulley means for actuating said high-speed driver from said motor, a low-speed shaft rotatably received through an opposite side of the gear box, pulley means for connecting said low-speed shaft to a lathe spindle, said high-speed driver including a shaft portion and an enlarged driving ring integral therewith and extending within the gear box, a gear fixed on the shaft portion adjacent to the driving ring, bearing means for supporting the shaft portion in the wall of the gear box, a bearing mount attached to the inside of the gear box and having bearing means received therein for rotatably supporting the outer surface of the driving ring, a bearing element disposed within the driving ring and having one end of the low-speed shaft supported therein and clutch mechanisms including low-speed gears and reverse gears for translating rotative movement of the driving ring to the low-speed shaft.

References Cited in the file of this patent
UNITED STATES PATENTS

| | | |
|---|---|---|
| 1,903,221 | MacKenzie | Mar. 28, 1933 |
| 2,168,744 | Perrine | Aug. 8, 1939 |
| 2,329,354 | McCarter | Sept. 14, 1943 |
| 2,500,308 | Campodonico et al. | Mar. 14, 1950 |